(12) United States Patent
Inoue et al.

(10) Patent No.: US 12,099,903 B2
(45) Date of Patent: Sep. 24, 2024

(54) DYNAMIC ADAPTIVE THRESHOLDING FOR QUBIT RESET

(71) Applicant: International Business Machines Corporation, Armonk, NY (US)

(72) Inventors: Ken Inoue, Elmsford, NY (US); Maika Takita, Croton on Hudson, NY (US); Antonio Corcoles-Gonzalez, Mount Kisco, NY (US); Scott Douglas Lekuch, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 17/813,082

(22) Filed: Jul. 18, 2022

(65) Prior Publication Data
US 2024/0020569 A1    Jan. 18, 2024

(51) Int. Cl.
*G06N 10/70*    (2022.01)
*G06N 10/20*    (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS

| 7,932,514 B2 | 4/2011 | Farinelli et al. |
| 10,235,635 B1 | 3/2019 | Abdo |
| 10,628,753 B2 | 4/2020 | Kelly |
| 11,112,842 B1 | 9/2021 | Smith et al. |
| 2019/0102692 A1* | 4/2019 | Kwant ............... G06F 18/2411 |

(Continued)

FOREIGN PATENT DOCUMENTS

| CN | 113326944 A | 8/2021 |
| WO | 2021217989 A1 | 11/2021 |

OTHER PUBLICATIONS

International Search Report received for International Application No. EP/2023/069756 dated Sep. 21, 2023, 14 pages.

(Continued)

*Primary Examiner* — April Y Blair
*Assistant Examiner* — Matthew W Wahlin
(74) *Attorney, Agent, or Firm* — Amin, Turocy & Watson, LLP

(57) ABSTRACT

One or more systems, devices, computer program products and/or computer-implemented methods of use provided herein relate to a process to dynamically determine a threshold for determining a state of a qubit and apply the threshold for operating a pulse to de-excite the qubit. A system can comprise a memory that stores computer executable components, and a processor that executes the computer executable components stored in the memory, wherein the computer executable components can comprise a decision component that is configured to determine a threshold of a plurality of thresholds to apply to measurement of a state of a qubit based on a probability distribution of state of the qubit, wherein a measurement at one side of the threshold is representative of the qubit being in the ground state, and wherein a measurement at another side of the threshold is representative of the qubit being in an excited state.

20 Claims, 10 Drawing Sheets

(56) References Cited

U.S. PATENT DOCUMENTS

| | | | | |
|---|---|---|---|---|
| 2020/0394524 | A1* | 12/2020 | Vainsencher | G06N 3/09 |
| 2021/0049482 | A1* | 2/2021 | Mezzacapo | G06N 5/04 |
| 2021/0182071 | A1* | 6/2021 | Khammassi | G06F 1/0328 |
| 2021/0241150 | A1 | 8/2021 | Tilly et al. | |
| 2021/0336621 | A1 | 10/2021 | Mottonen et al. | |
| 2021/0342161 | A1 | 11/2021 | Lauer et al. | |
| 2022/0199888 | A1* | 6/2022 | Daraeizadeh | G06N 10/00 |

OTHER PUBLICATIONS

Liu, Yehan "Quantum Feedback Control of Multiple Superconducting Qubits" Yale University, Dec. 31, 2016 (Dec. 31, 2016), URL:https://qulab.eng.yale.edu/documents/t heses/yehan_thesis.pdf, 181 pages.

Ryan, et al. ""Hardware for Dynamic Quantum Computing"" arXiv:1704.08314v1 [quant-ph] Apr. 26, 2017, 13 pages.

Duan, et al. ""Mitigating Crosstalk-Induced Qubit Readout Error with Shallow-Neural-Network Discrimination"", Phys. Rev. Applied 16, 024063, Published Aug. 31, 2021, 10 pages.

Mell et al., "The NIST Definition of Cloud Computing," Recommendations of the National Institute of Standards and Technology, NIST Special Publication 800-145, Sep. 2011, 7 pages.

Corcoles et al., "Exploiting dynamic quantum circuits in a quantum algorithm with superconducting qubits" arXiv:2102.01682 (2021); https://doi.org/10.48550/arXiv.2102.01682.

Vlastakis et al., "Characterizing entanglement of an artificial atom and a cavity cat state with Bell's inequality" Nat Commun 6, 8970 (2015). https://doi.org/10.1038/ncomms9970.

Ristè et al., "Initialization by Measurement of a Superconducting Quantum Bit Circuit" Phys. Rev. Lett. 109, 050507; (2012); arXiv:1204.2479; https://arxiv.org/abs/1204.2479.

D. Ristè et al., "Feedback control of a solid-state qubit using high-fidelity projective measurement" Phys. Rev. Lett. 109, 240502 (2012); arXiv:1207.2944; https://arxiv.org/abs/1207.2944.

* cited by examiner

DYNAMIC ADAPTIVE THRESHOLDING FOR QUBIT RESET

STATEMENT REGARDING FEDERALLY SPONSORED RESEARCH OR DEVELOPMENT

This invention was made with Government support under Contract No.: W911NF-16-1-0114 awarded by the Army Research Office (ARO). The Government has certain rights in this invention.

TECHNICAL FIELD

The present disclosure relates to determining a state of a qubit of a quantum system, and more specifically to dynamically determining a threshold for accurately determining a state of a qubit of a quantum system.

BACKGROUND

In quantum computing systems, reset of a qubit to a lesser-excited state or a ground state can be performed, such as for re-employing that qubit in a same or different quantum operation.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can provide a process to dynamically determine a threshold for determining a state of a qubit, and optionally to apply the threshold for operating a pulse to de-excite the qubit to the ground state of the qubit.

In accordance with an embodiment, a system can comprise a memory that stores computer executable components, and a processor that executes the computer executable components stored in the memory, wherein the computer executable components can comprise a decision component that is configured to determine a threshold of a plurality of thresholds to apply to measurement of a state of a qubit based on a probability distribution of state of the qubit, wherein a measurement at one side of the threshold is representative of the qubit being in the ground state, and wherein a measurement at another side of the threshold is representative of the qubit being in an excited state.

An advantage of the above-indicated system can be determining a threshold in real time to apply to a measurement of a state of a qubit to enable more accurate measurements of the equipment. This can reduce a number of operations employed to produce an acceptable result.

In accordance with another embodiment, a computer-implemented method can comprise determining, by a system operatively coupled to a processor, a threshold of a plurality of thresholds to apply to measurement of a state of a qubit based on a probability distribution of state of the qubit, wherein a measurement at one side of the threshold is representative of the qubit being in the ground state, and wherein a measurement at another side of the threshold is representative of the qubit being in an excited state.

An advantage of the above-indicated method can be determining a threshold in real time to apply to a measurement of a state of a qubit to enable more accurate measurements of the equipment. This can reduce a number of operations employed to produce an acceptable result.

In accordance with yet another embodiment, a computer program product providing a process to dynamically determine a threshold for determining a state of a qubit can comprise a computer readable storage medium having program instructions embodied therewith, the program instructions executable by a processor to cause the processor to determine, by the processor, a threshold of a plurality of thresholds to apply to measurement of a state of the qubit based on the probability distribution of state of the qubit, wherein a measurement at one side of the threshold is representative of the qubit being in the ground state, and wherein a measurement at another side of the threshold is representative of the qubit being in an excited state.

An advantage of the above-indicated computer program product can be determining a threshold in real time to apply to a measurement of a state of a qubit to enable more accurate measurements of the equipment. This can reduce a number of operations employed to produce an acceptable result.

Another advantage of one or more of the above-indicated system, computer-implemented method and/or computer program product can be an ability to dynamically adapt a threshold employed for determining a state of a qubit, based on the present probability distribution determined. In such case, more accurate determination of an actual state of the qubit can be employed. This can reduce inaccurate determinations, which can thus increase execution of a quantum circuit performed. That is, additional operations can be performed, optimizing coherence time usage of one or more qubits. And further, reduced inaccurate determinations can result in more accurate final measurements of the quantum circuit performed.

In one or more embodiments of the above-indicated system, computer-implemented method and/or computer program product, the decision component can be configured to selectively determine the threshold based on one or more electrical, mechanical or structural parameters of a qubit physical circuit comprising the qubit or on one or more electrical, mechanical or structural parameters of a quantum device comprising the qubit.

In one more embodiments of the above-indicated system, computer-implemented method and/or computer program product, a readout component can be configured to determine a plurality of measurements defining plural states of the qubit at different instances, a calibration component can integrate the plurality of measurements to map the plural states to one-dimensional signal values representing a selected probability distribution for excited and ground states of the qubit, and a classification component can, based on the signal values, be configured to calculate the probability distribution of state classification error of the qubit, wherein the decision component can be configured to apply a threshold of the different thresholds that minimizes the probability of state classification error of the qubit.

An advantage of one or more of the above-indicated system, computer-implemented method and/or computer program product can be dynamic application of an accurate and probability distribution-based threshold, as compared to continuous use of an inapplicable threshold, such as for multiple reset iterations.

In one more embodiments of the above-indicated system, computer-implemented method and/or computer program product, a readout component can be configured to measure a state of the qubit, and a pulse generation component can generate a pulse that resets the qubit to the ground state of the qubit based on a determination that the qubit is in the excited state, wherein a threshold of the different thresholds is applied to provide the determination.

An advantage of one or more of the above-indicated system, computer-implemented method and/or computer program product can be an ability to reset a qubit to a true ground state, rather than inaccurately resetting to a lower excited state that is not a true ground state.

DETAILED DESCRIPTION

Figure 1:
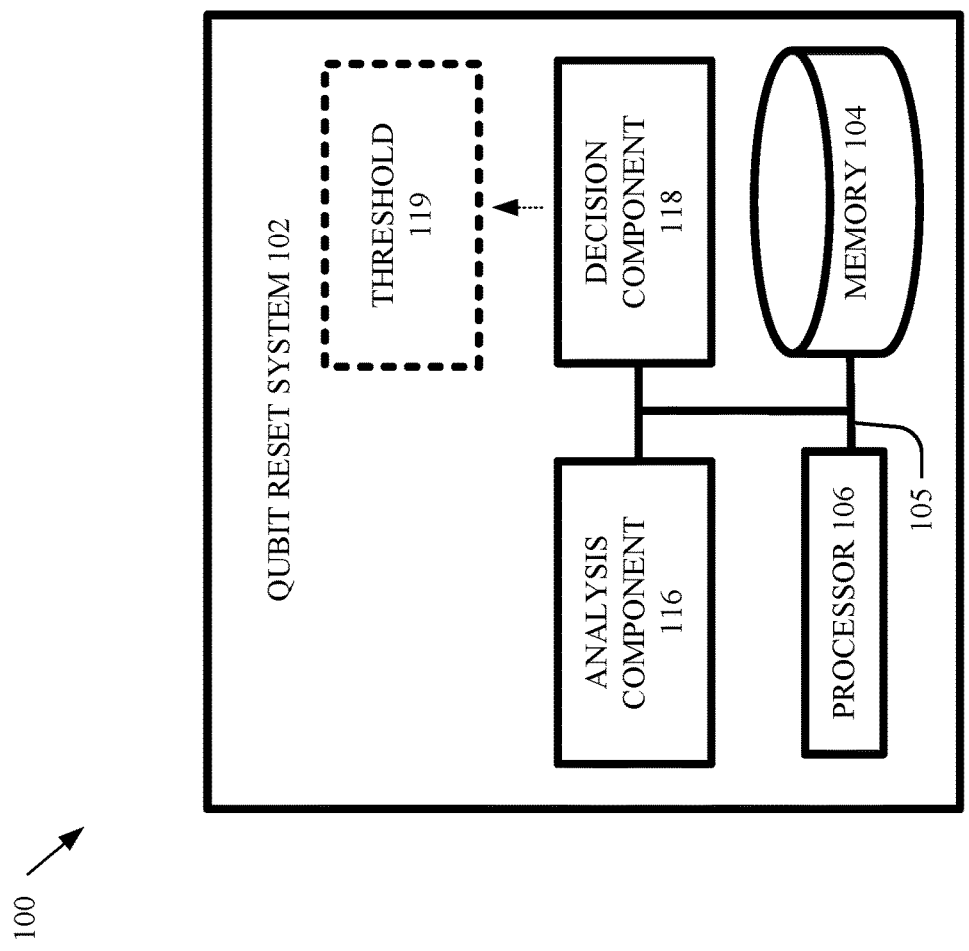
FIG. 1 illustrates a block diagram of an example, non-limiting system that can provide a process to dynamically determine a threshold for determining a state of a qubit, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, a quantum circuit can be a set of operations, such as gates, performed on a set of real-world physical qubits with the purpose of obtaining one or more qubit measurements. A quantum processor can comprise the one or more real-world physical qubits.

Qubit states only can exist (or can only be coherent) for a limited amount of time. Thus, an objective of operation of a quantum logic circuit (e.g., including one or more qubits) can be to maximize the utilization of the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit can be supported, such as by a pulse component (also herein referred to as a waveform generator), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions.

Initializing qubits to a known state can be a standard element of universal quantum computation. The initialization typically can employ a qubit measurement followed by an operation conditional on the measurement outcome. This initialization scheme can be limited by the measurement fidelity and can be improved by running the measurement and reset operations more than once. However, an optimal measurement threshold used to discriminate the qubit states from the measurement signal can be dependent on the expected distributions of qubit states (e.g., probability distribution), which are not constant throughout a sequence, so using a single threshold can result in higher initialization error.

For example, a conditional reset (also herein referred to as an active reset) can be employed to read out qubit state and a reset pulse can be applied based on the result. That is, a qubit read-out process can map the qubit state to a one-dimensional "signal value", such as via digital down-conversion to in phase and quadrature (I, Q) components, integration and rotation, and/or other applicable processes. Integration of the signal values can be performed with a matched filter kernel. The signal values can represent a sum of (multiple) normal distributions for respective excited and ground states of the qubit. Based on calibration runs, a state threshold, also herein referred to as a state threshold can be employed. The actual qubit state can be classified employing the state threshold. For example:

Excited ($|1>$) State if Signal Value≥Threshold, or

Ground ($|0>$) State if Signal Value<Threshold.

Based on the determined actual qubit state, a reset pulse can be conditionally generated to affect the qubit, such as where the qubit is not yet in a ground state (e.g., signal value is greater than or equal to the threshold. However, repeating the conditional reset is not guaranteed to reduce residual |1> population successively. Rather, employing the same threshold over and over again can be detrimental, introducing initialization error, such as inaccurate determinations of qubit state, which can thus result in a non-grounded qubit being employed for a quantum circuit operation, subsequently resulting in error introduced into the quantum circuit measurement results.

Figure 3:
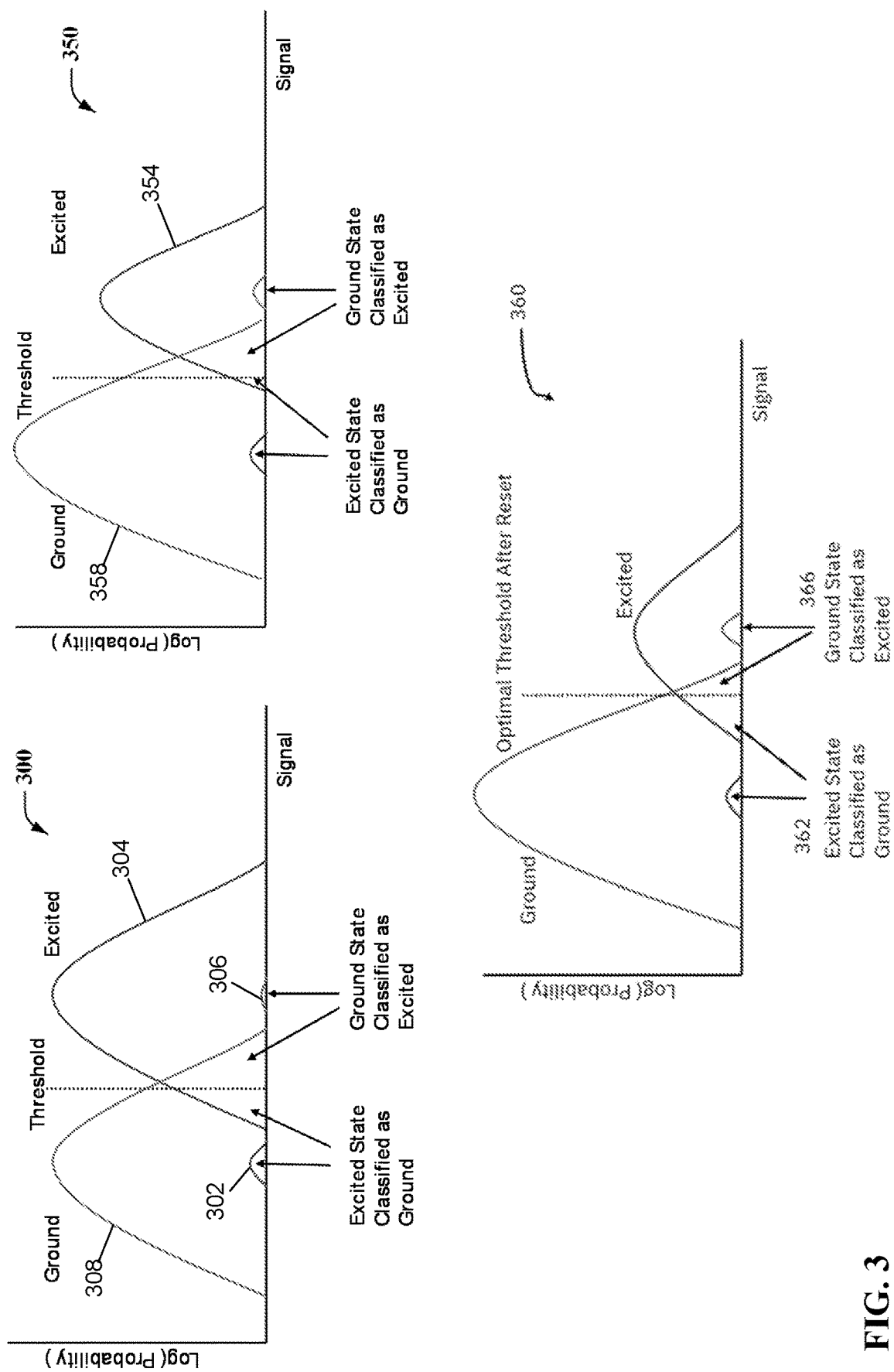
FIG. 3 illustrates a set of graphs demonstrating one or more thresholding concepts associated with performance of one or more processes by the non-limiting system of FIG. 2, in accordance with one or more embodiments described herein.

In an example, looking briefly to graph 300 of FIG. 3, illustrated is a threshold that can be employed to minimize determination errors against |+> state. Graphed are ground and excited state portability distributions (e.g., Log of the probability) against qubit state (e.g., 0 to 1). As shown, one or more peaks 302 of the excited state probability distribution 304 can be classified as ground, such as where the peak 302 can be caused by T1 decay. Also as shown, one or more peaks 306 of the ground state probability distribution 308 can be classified as excited, such as where the peak 306 can be caused by a "hot" qubit state or measurement back action. Additional causes of such error, for either peak 302 or 306 can additionally, and/or alternatively, comprise calibration inaccuracy based on frequency or amplitude, and/or cross talk.

Looking next briefly to graph 350 of FIG. 3, illustrated are a ground state probability distribution 358 and an excited state probability distribution 354 relative to the same threshold as illustrated in graph 300. As shown, a conditional reset can change the qubit state distributions 308 and 304, respectively, to the qubit state distributions 358 and 354, such as increasing |0> and decreasing |1>. Furthermore, in application, dynamic effects in the qubits, decay, noise, and/or the like can cause the distributions to change in shape after each reset iteration. That is, employing the same threshold can cause a wrong determination of a state of the qubit, thus leading to inaccurate measurements from a quantum circuit operation employing the qubit after the conditional reset.

To account for one or more deficiencies of existing techniques for qubit reset, generally, provided are one or more embodiments of a system, computer-implemented method and/or computer program product that can provide a process to dynamically determine a threshold for determining a state of a qubit, and optionally to apply the threshold for operating a pulse to de-excite the qubit to the ground state.

This can be desired because a qubit can be re-employed in an operation on the same quantum circuit and/or a qubit can be reset to more quickly begin operation of a second quantum circuit. Accurate reset can allow for reduced error in quantum circuit operation and resulting measurements determined therefrom. Moreover, accurate reset can allow for generally increasing usable coherence time of one or more qubits of a system. For example, a first qubit being reset more quickly and accurately can affect longer useable coherence time of a second qubit that is to interact with the first qubit after reset of the first qubit.

Generally, the threshold can be determined based on one or more measurement readings of a respective qubit in an excited state and/or in a ground state. Based on the measurements, a probability distribution of the particular state of the qubit can be determined. Also based on the measurements, an applicable threshold can be determined. The threshold can be employed to determine an actual state of a qubit. One or more iterations can be performed. Where a qubit is not yet in a ground state, the resulting information can be employed to generate a reset pulse to affect (e.g., de-excite) the qubit. The process of measurement and threshold determination can be repeated to determine if one or more additional reset pulses should be generated, with the goal being to accurately de-excite the qubit to a respective ground state.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
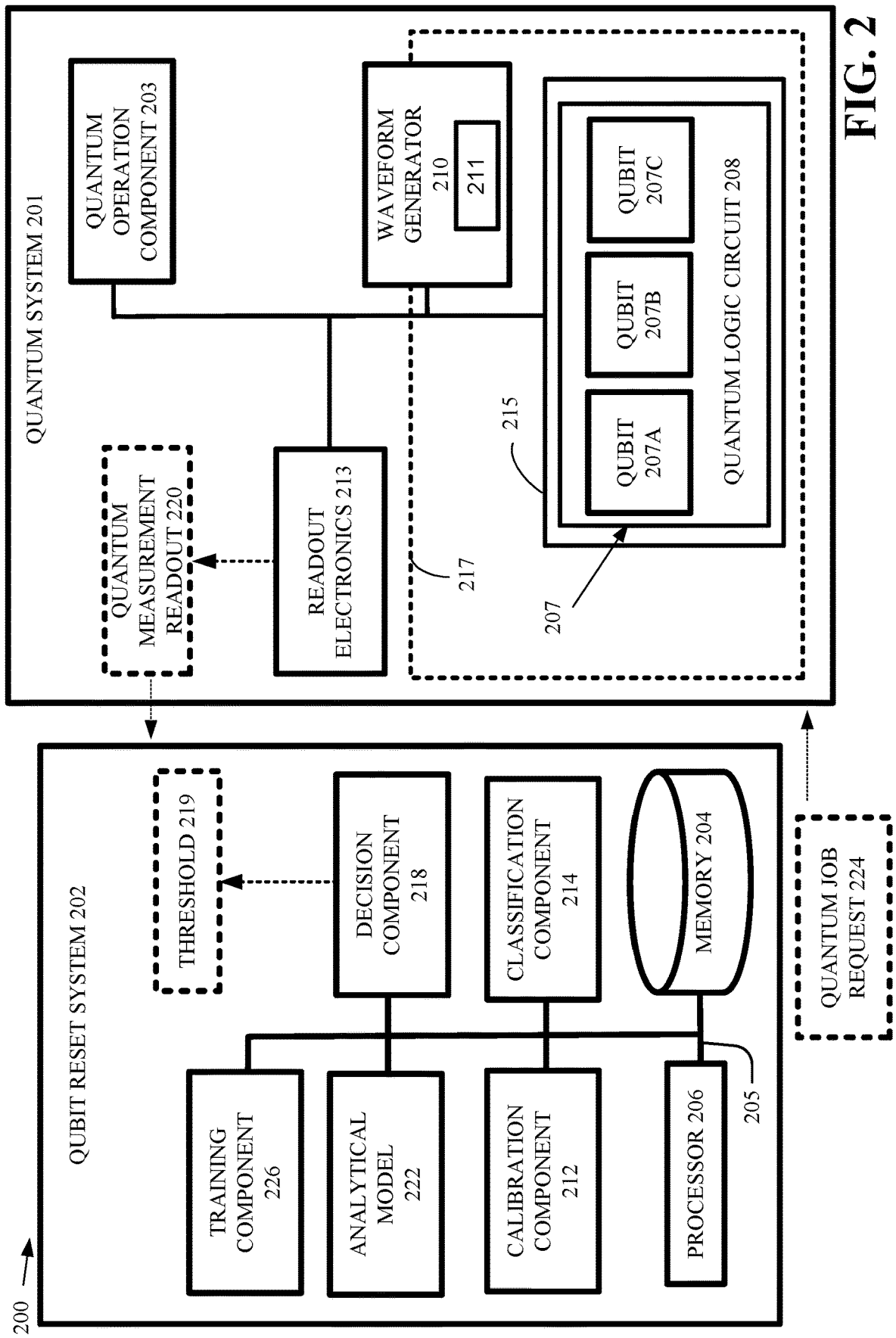
FIG. 2 illustrates a block diagram of another example, non-limiting system that can provide a process to dynamically determine a threshold for determining a state of a qubit, and optionally to apply the threshold for operating a pulse to de-excite the qubit to the ground state, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can provide a process to dynamically determine a threshold for determining a state of a qubit, as briefly described above. At FIG. 1, illustrated is a block diagram of an example, non-limiting system 100 that can provide such probing process, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise a classical system 102 that can be employed with a quantum system, not shown. The classical system 102, e.g., a qubit reset system 102, can comprise one or more components, such as a memory 104, quantum processor 106, bus 105, analysis component 116 and/or decision component 118.

Generally, the qubit reset system 102, can employ the decision component to determine a threshold 119 of a plurality of thresholds to apply to measurement of a state of a qubit. This determination can be based on a probability distribution of state of the qubit. Different from the illustrations of FIG. 3, the threshold can be determined from a set of thresholds. Also different from the illustrations of FIG. 3, the threshold can take into account the probability distributions absent continual use of a same or previous threshold. That is, the state threshold 119 can be dynamically determined based on the probability distribution. A measurement at one side of, such as below, the threshold can be representative of the qubit being in the ground state, and a measurement at another side of, such as below the threshold can be representative of the qubit being in an excited state, such as a first excited state. In one or more embodiments, the probability distribution data (e.g., data and/or metadata) can be determined by the analysis component 116.

Turning next to FIG. 2, the figure illustrates a diagram of an example, non-limiting system 200 that can provide a process to dynamically determine a threshold for determining a state of a qubit, and optionally to apply the threshold for operating a pulse to de-excite the qubit to the ground state. For example, FIG. 2 illustrates a block diagram of an example, non-limiting system 200 that can employ a waveform generator 210 to affect a qubit 207A, based on use of a threshold 219 that can be dynamically altered for different measurement iterations (e.g., quantum measurement readouts 220) that result in different probability distributions of qubit state of the qubit 207A.

Generally, the non-limiting system 200 can apply one or more processes for resetting of qubits while minimizing reset error by iteration. More particularly, the non-limiting system 200 can perform a readout of a qubit, employ the readout to dynamically determine the threshold 219, employ the threshold 219 to determine an actual state of the qubit, and employ the waveform generator 210 to further reset the qubit, if conditionally desired, such as where the qubit is not yet in a ground state and it is desired for the qubit to be reset to the ground state of the qubit.

Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

In one or more embodiments, the non-limiting system 200 can be a hybrid system and thus can include both a quantum system and a classical system, such as a quantum system 201 and a classical-based system 202 (also herein referred to as a classical system 202). In one or more other embodiments, the quantum system 201 can be separate from, but function in combination with, the classical system 202 (e.g., qubit reset system 202). In one or more embodiments, one or more components of the quantum system 201, such as the readout electronics 213, can be at least partially comprised by the classical system 202, or otherwise comprised external to the quantum system 201. In one or more embodiments, one or more components of the classical system 202 can be at least partially comprised by the quantum system 201, or otherwise comprised external to the classical system 202.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

The classical system 202 and/or the quantum system 201 can be associated with, such as accessible via, a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090). For example, the classical system 202 can be associated with a cloud computing environment 950 such that aspects of classical processing can be distributed between the classical system 202 and the cloud computing environment 950.

Turning first to the quantum system 201, generally based on a quantum job request 224, such as comprising a quantum circuit to be executed, the quantum operation component 203 and/or quantum processor 206 can direct execution of the quantum circuit at the quantum logic circuit 208.

Generally, the quantum system 201 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 220, can be responsive to the quantum job request 224 and associated input data and can be based at least in part on the input data, quantum functions and/or quantum computations.

In one or more embodiments, the quantum system 201 can comprise components, such as a quantum operation component 203, a quantum processor 215, pulse component 210 (e.g., a waveform generator) and/or a readout electronics 213. In other embodiments, the readout electronics 213 can be comprised at least partially by the classical system 202 and/or be external to the quantum system 201. The quantum processor 215 can comprise the quantum logic circuit 208 comprising one or more, such as plural, qubits 207. Individual qubits 207A, 207B and 207C, for example, can be fixed frequency and/or single junction qubits, such as transmon qubits.

The quantum processor 215 can be any suitable processor. The quantum processor 206 can generate one or more instructions for controlling the one or more processes of the quantum operation component 203 and/or for controlling the quantum logic circuit 208.

The quantum operation component 203 can obtain (e.g., download, receive, search for and/or the like) a quantum job request 224 requesting execution of one or more quantum programs and/or a physical qubit layout. The quantum job request 224 can be provided in any suitable format, such as a text format, binary format and/or another suitable format. In one or more embodiments, the quantum job request 224 can be received by a component other than of the quantum system 201, such as a by a component of the classical system 202.

The quantum operation component 203 can determine one or more quantum logic circuits, such as the quantum logic circuit 208, for executing a quantum program. In one or more embodiments, the quantum operation component 203 and/or quantum processor 206 can direct the waveform generator 210 to generate one or more pulses 211, tones, waveforms and/or the like to affect one or more qubits 207.

The waveform generator 210 can generally perform one or more quantum processes, calculations and/or measurements for shifting the frequency of one or more qubits 207, such as when in respective excited states. For example, the waveform generator 210 can operate one or more qubit effectors, such as qubit oscillators, harmonic oscillators, pulse generators and/or the like to cause one or more pulses to stimulate and/or manipulate the state(s) of the one or more qubits 207 comprised by the quantum system 201.

The readout electronics 213 can provide transmission, e.g., readout, of one or more readings, signals and/or the like to the classical system, such as to the calibration component 212 of the qubit reset system 202.

The quantum logic circuit 208 and a portion or all of the waveform generator 210 can be contained in a cryogenic environment, such as generated by a cryogenic chamber 217, such as a dilution refrigerator. Indeed, a signal can be generated by the waveform generator 210 to affect one or more of the plurality of qubits 207. Where the plurality of qubits 207 are superconducting qubits, cryogenic temperatures, such as about 4K or lower can be employed for function of these physical qubits. Accordingly, one or more elements of the readout electronics 213 also can be constructed to perform at such cryogenic temperatures.

The readout electronics 213, or at least a portion thereof, can be contained in the cryogenic chamber 217, such as for reading a state, frequency and/or other characteristic of qubit, excited, decaying or otherwise.

Further, the aforementioned description(s) refer(s) to the operation of a single set of diagnostics run on a single qubit. However, employment of the diagnostics can be provided, where suitable at one or more qubits at a time of a quantum system. For example, non-neighbor qubits of a qubit logic circuit can be simultaneously measured.

Next, discussion turns to operations of the classical system 202 that can be performed on and/or employing the readout output from the quantum system 201, to thereby provide generation of the threshold 219 and subsequent qubit state determination of a qubit 207.

Turning now to the classical system specifically, generally, the classical system 202 can comprise any suitable type of component, machine, device, facility, apparatus and/or instrument that comprises a processor and/or can be capable of effective and/or operative communication with a wired and/or wireless network. All such embodiments are envisioned. For example, the classical system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the classical system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The qubit reset system 202 can comprise a plurality of components. The components can include a memory 204, processor 206, bus 205, calibration component 212, classification component 214, analysis component 216, decision component 218, analytical model 222 and/or training component 226.

Generally, the qubit reset system 202 can obtain a quantum measurement readout 220 from the quantum system 201, and provide a determination of a threshold 219 based thereon.

Discussion first turns briefly to the processor 206, memory 204 and bus 205 of the qubit reset system 202. For example, in one or more embodiments, the classical system 202 can comprise the processor 206 (e.g., computer processing unit, microprocessor, classical processor, quantum processor and/or like processor). In one or more embodiments, a component associated with qubit reset system 202, as described herein with or without reference to the one or more figures of the one or more embodiments, can comprise one or more computer and/or machine readable, writable and/or executable components and/or instructions that can be executed by processor 206 to provide performance of one or more processes defined by such component(s) and/or instruction(s). In one or more embodiments, the processor 206 can comprise the calibration component 212, classification component 214, analysis component 216, decision component 218, analytical model 222 and/or training component 226.

In one or more embodiments, the qubit reset system 202 can comprise the computer-readable memory 204 that can be operably connected to the processor 206. The memory 204 can store computer-executable instructions that, upon execution by the processor 206, can cause the processor 206 and/or one or more other components of the qubit reset system 202 (e.g., calibration component 212, classification component 214, analysis component 216, decision component 218, analytical model 222 and/or training component 226) to perform one or more actions. In one or more embodiments, the memory 234 can store computer-executable components (e.g., calibration component 212, classification component 214, analysis component 216, decision component 218, analytical model 222 and/or training component 226).

The qubit reset system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the qubit reset system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the qubit reset system 202 and/or of the non-limiting system 200 can reside in the cloud, and/or can reside locally in a local computing environment (e.g., at a specified location(s)).

In addition to the processor 206 and/or memory 204 described above, the qubit reset system 202 can comprise one or more computer and/or machine readable, writable and/or executable components and/or instructions that, when executed by processor 206, can provide performance of one or more operations defined by such component(s) and/or instruction(s).

Turning now to the additional components of the qubit reset system 202 (e.g., the calibration component 212, classification component 214, analysis component 216, decision component 218, analytical model 222 and/or training component 226), generally, the qubit reset system 202 can obtain a quantum measurement readout 220 from the quantum system 201, and determine a threshold 219 based thereon.

Turning first to the calibration component 212, the calibration component 212 can locate, find, search and/or otherwise determine a quantum measurement readout 220 from the quantum system 201, relative to a qubit 207. For example, the calibration component 212 can locate the quantum measurement readout 220 based on one or more instructions from the processor 206 and/or from a user entity. The quantum measurement readout 220 can have been output by the readout electronics which can determine a plurality of measurements defining plural states of the qubit at different instances (e.g., the quantum measurement readout 220).

Based on the quantum measurement readout 220, the calibration component 212 can integrate the plurality of measurements of the quantum measurement readout 220 to map the plural states to one-dimensional signal values representing a selected probability distribution, such as a known probability distribution or a sum of normal distributions, for excited and ground states of the qubit.

For example, readout results of a quantum state of a qubit 207 can be approximated by a sum of two normal distributions with mean±μ and the same standard deviation σ, weighted by P(1)=α and P(0)=1−P(1)=1−α at Equation 1.

$$\alpha N_{\mu,\sigma}(t) + (1-\alpha)N_{-\mu,\sigma}(t).$$ Equation 1:

$N_{\mu,\sigma}(t)$ can be the normal distribution with mean μ and standard deviation σ. The normal distributions pertain to (classical) measurement results, not quantum state, so they can be added up like a mixed state.

Figure 4:
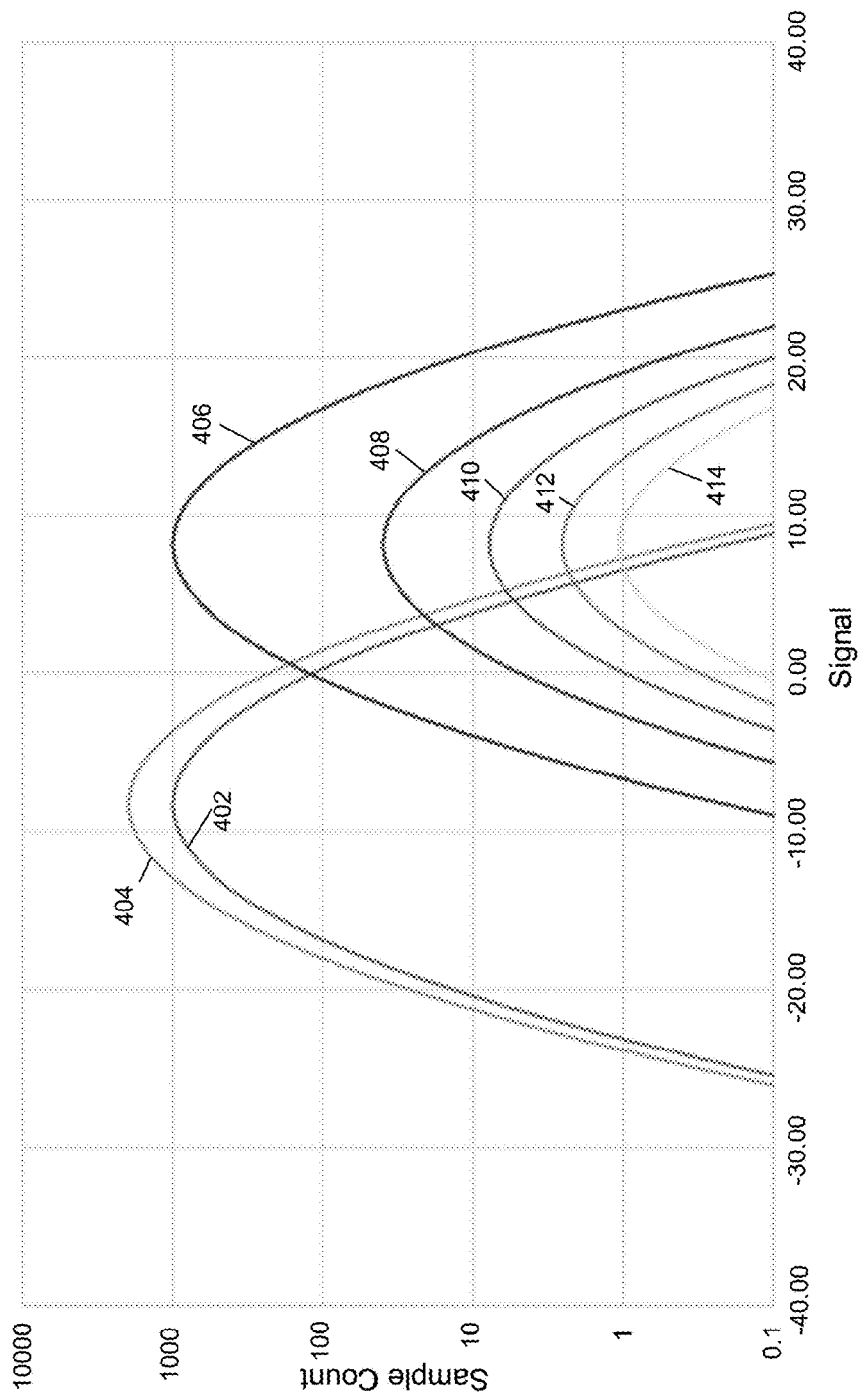
FIG. 4 illustrates a graph demonstrating one or more probability distribution concepts associated with performance of one or more processes by the non-limiting system of FIG. 2, in accordance with one or more embodiments described herein.

For example, looking briefly to FIG. 4, a set of histograms 402 and 404 can represent ground states. Histogram 402 can represent the probability distribution of the ground state of a qubit before any reset. Histogram 404 can represent the probability distribution of the ground state of the qubit after 1 reset. Histograms 406, 408, 410, 412 and 414 can represent excited states of the qubit. Histogram 406 can represent the probability distribution of the excited state of the qubit before any reset. Histogram 408 can represent the probability distribution of the excited state of the qubit after 1 reset. Histograms 410, 412 and 414 can represent the probability distribution of the excited states of the qubit after additional successive resets 2, 3 and 4, respectively. As illustrated, repeated resets using optimal thresholds (e.g., dynamically determined thresholds 219) for each pass can yield a desired result of decreasing errors.

Figure 5:
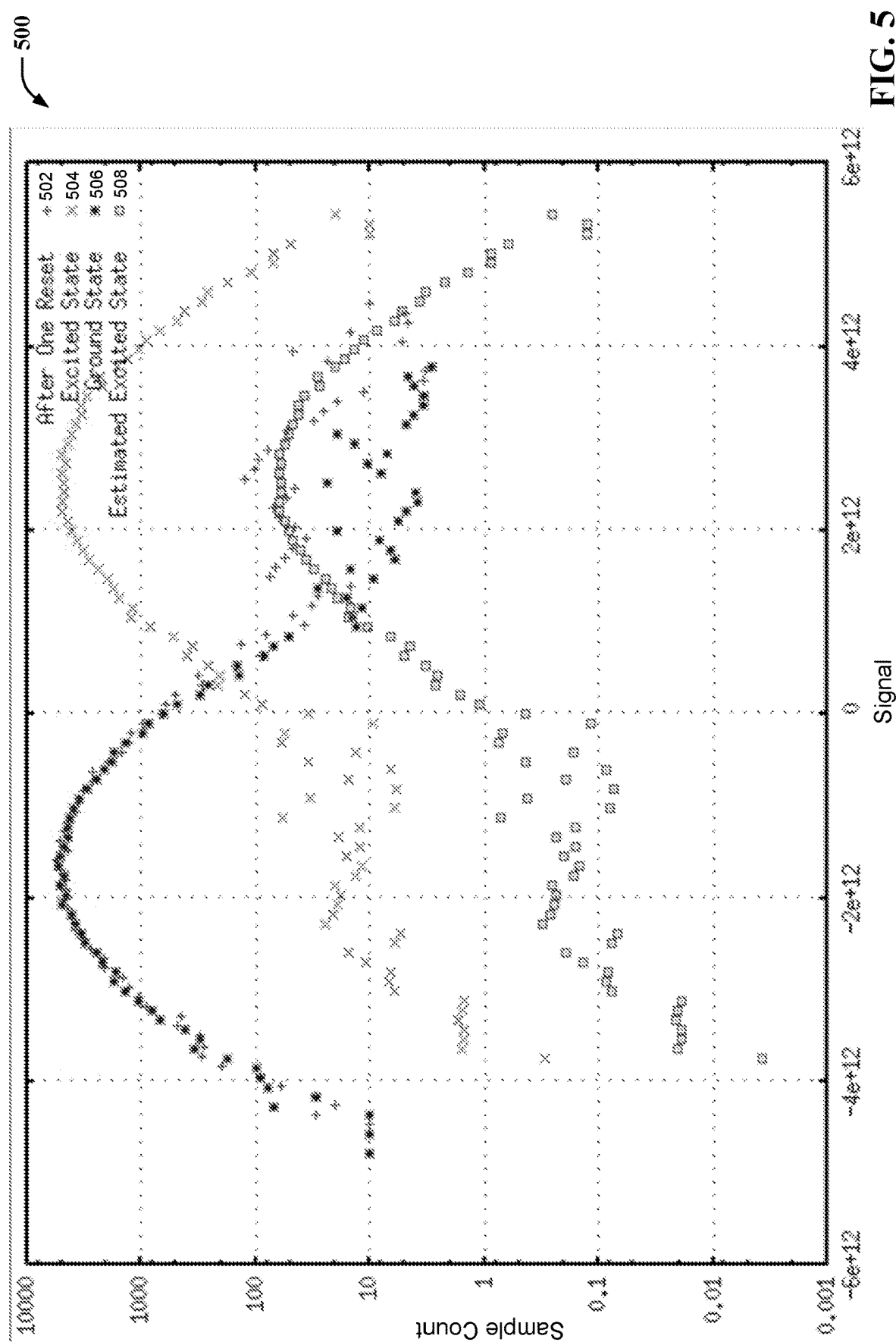
FIG. 5 illustrates another graph demonstrating one or more probability distribution concepts associated with performance of one or more processes by the non-limiting system of FIG. 2, in accordance with one or more embodiments described herein.

Turning additionally to FIG. 5, actual histograms of probability distributions are depicted. As shown, the distributions may not exactly fit a perfect theoretical shape, such as shown at FIG. 4. It is noted that group 502 (■), group 504 (x) and group 506 (+) are actual qubit measurements, while group 508 (□) represents only an estimated state population of excited state after one reset. Group 506 (+) is the result of measurements of qubits in |+> state after one reset. In one or more other cases, the excited state population after one reset can be determined as actual qubit measurements, such as by the calibration component 212. Adding group 502 (■) scaled by population ratio (minimal change, not shown) and group 508 (□) would yield the actual expected state distribution after one reset.

These plurality of measurements can be output to the classification component 214. The classification component 214 can generally, based on the signal values, calculate the probability distribution of state classification error of the qubit. See, e.g., FIG. 3, graph 360. As indicated, the classification error for a given threshold can be given by the size of four ("4") areas pointed to by the Excited State Classified as Ground areas 362 and Ground State Classified as Excited areas 366. An optimal threshold can be determined by an exhaustive search between the two primary peaks of the probability distributions, such as by calculating an error (total area size) for each prospective threshold value.

For example, when the measurements are approximated by a sum of two normal distributions, for a threshold τ to classify these results, the probability of state classification error can be given by Equation 2.

$$E(\alpha,\tau) = \alpha \int_{-\infty}^{\tau} N_{\mu,\sigma}(t)dt + (1-\alpha)\int_{\tau}^{\infty} N_{-\mu,\sigma}(t)dt.$$ Equation 2:

At Equation 2, the first term is the normal cumulative distribution function $C_{\mu,\sigma}(t)$ with weight α, representing the probability of a |1> state readout erroneously classified as |0> state. The second term is $(1-C_{-\mu,\sigma}(t))$ with weight (1−α), representing the probability of a |0> readout erroneously classified as |1> state. These errors can result in |1> states after a conditional reset operation. The existence of a minimum can be derived from the fact that C(t) is monotonically increasing over t, C(−inf)=0 and C(+inf)=0, where 'inf' denotes infinity. In one or more embodiments, E(a, t) can be estimated by using experiment data (e.g., histogram binning) or a spreadsheet.

In one or more embodiments, it is noted that the classification component 214 and calibration component 212 can be comprised by and or make up an analysis component, as illustrated at FIG. 1 (e.g., analysis component 116).

Employing the results of the calibration component 212 and the classification component 214, the decision component 218 can determine a threshold 219 of a plurality of thresholds to apply to measurement of a state of a qubit based on a probability distribution of state and/or of probability distribution of state classification error of the qubit.

In one or more embodiments, the decision component 218 can employ and/or comprise an analytical model 222. The analytical model 222 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 222 can comprise a deep neural network (DNN) or a recurrent neural network (RNN).

For example, the decision component 218 can employ a supervised learning model (e.g., analytical model 222) that determines the threshold 219 to apply for a particular quantum circuit based on one or more kernels 612 (FIG. 6) that can apply to the particular quantum circuit or to the environment of the qubit. For example, the threshold 219 can be of a plurality of historical and/or stored thresholds, as depicted in the schematic 600 of FIG. 6, (to be discussed in detail below), such as determined by an analytical model.

The kernels 612 can be written based on a plurality of calibration measurements defining plural states of the qubit at different instances. The decision component 218 can further determine the threshold 219 of a set of different thresholds to apply to a qubit (e.g., to measurements and/or data based on a readout of the qubit) based on one or more of the kernels 612. A kernel 612 can be and/or can comprise a classification that allows for integration of a shot in a more accurate manner. A kernel 612 can define a use of the qubit, and can be specific to one or more thresholds 219 of the set of thresholds, in addition to corresponding to particular, such as historical, calibration measurements, and thus applying to particular probability distributions, such as for a particular qubit. In one or more embodiments, a kernel 612 can be integrated over readout data, and therefore can be mathematically "multiplicatively commutative" with the thresholds, e.g., such as where a set of kernels 612 can be multiplied by an appropriate scaling factor so that the same threshold can be used for all cases.

In one or more embodiments, kernels 612 can be unused and/or undefined, such as where only thresholds can be adapted.

Additionally or alternatively, in one or more embodiments, the decision component 218 can selectively determine the threshold 219 at least partially based on one or more electrical, mechanical or structural parameters of a qubit physical circuit (e.g., qubit physical circuit 208) comprising the qubit or on one or more electrical, mechanical or structural parameters of a quantum device comprising the qubit. For example, in certain implementations of a qubit physical circuit, amplitude envelopes of the excited state and/or the ground state differed.

A measurement at one side of, such as below, the determined threshold 219 can be representative of the qubit being in the ground state, and a measurement at another side of, such as above, the threshold 219 can be representative of the qubit being in an excited state, such as a first excited state. The decision component 218, and thus the threshold 219, can take into account the probability distributions absent continual use of a same or previous threshold. That is, the state threshold 219 can be dynamically determined based on the probability distribution.

Referring now sill to FIG. 2, the threshold 219 determined can be employed by the decision component 218 to output a current state of the qubit from which the quantum measurement readout results 220 were obtained. Conditionally, where it is desired that the qubit be in the ground state, and the determination by the decision component 218 is that the qubit is not in the ground state, a communication can be sent to the quantum system 201 defining and/or requesting that a reset pulse 211 be generated by the waveform generator 210 to further affect the respective qubit. In one or more cases, the particular reset pulse 211 can be based on the determination of the decision component 218.

In one or more cases, the reset pulse can be a conditional Pi rotation around a Bloch sphere X axis which can change the first excited state to the ground state. In one or more other cases, the reset pulse can be one that resets the second excited state (|2>) to the ground state, if the decision component 218 determined that the qubit is in the second excited state.

In one or more embodiments, the qubit reset system 202 can comprise a training component 226. The training component 226 can train the analytical model 222, such as based on previously employed thresholds 219, kernels 612, probability distributions, signal values, and/or the like. In one or more cases, historical data can be stored at the memory 204 and/or at any other suitable store internal to and/or external to the qubit reset system 202. The training component 226 can execute the training at any suitable frequency, such as after each calibration/classification/decision process iteration, based on a selected timing, and/or on-demand. In accordance with the training, the analytical model 222 can be continually updated. Further, by the training, subsequent iterations of use of the qubit reset system 202 can be made more accurate and/or efficient.

Figure 6:
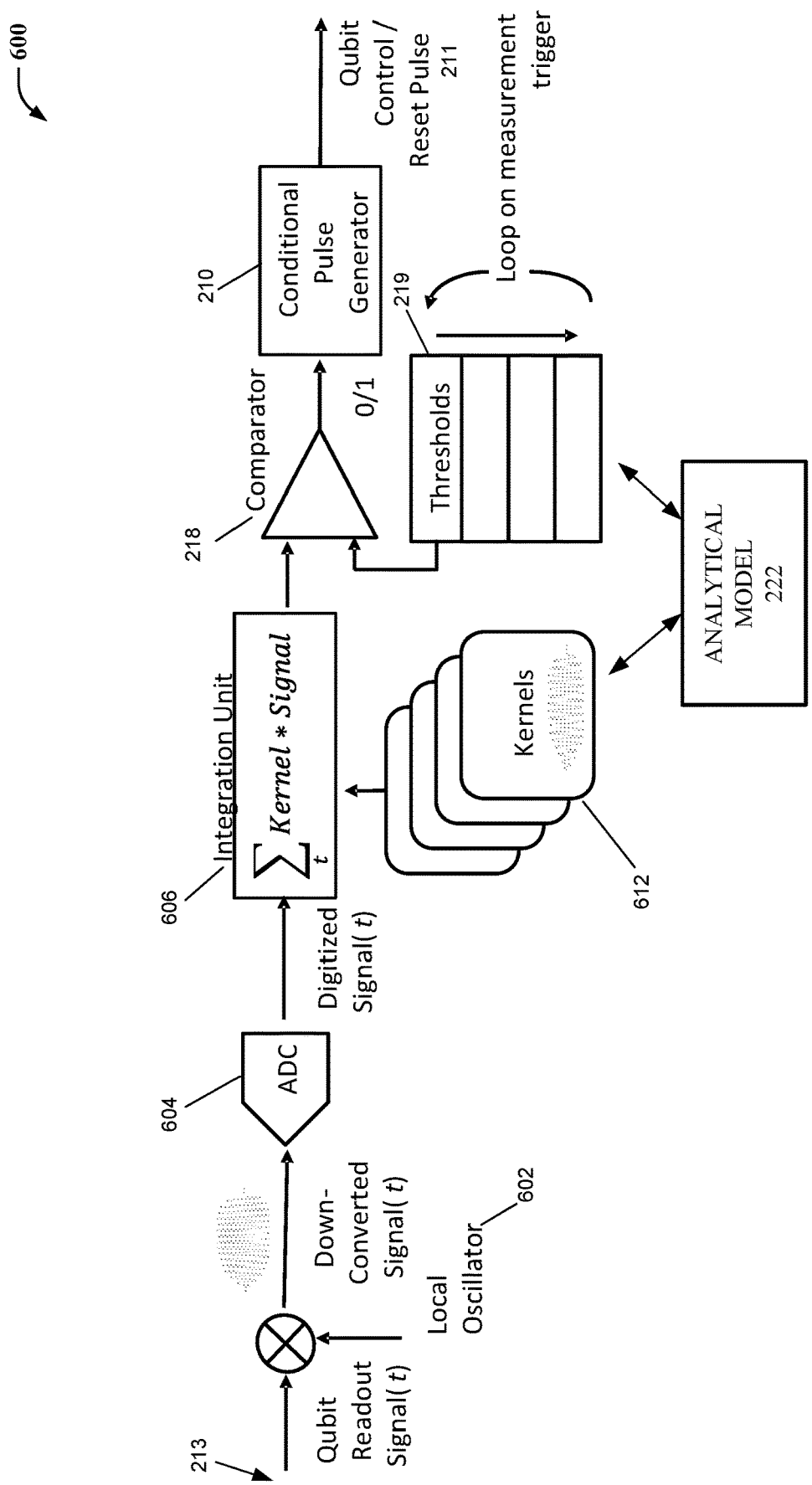
FIG. 6 depicts a schematic of processes of determination and use of a threshold, in accordance with one or more embodiments described herein.

Turning now to FIG. 6, a measurement readout 220, such as from the readout electronics 213 can be obtained. The signal can be defined by a voltage as a function of time.

A local oscillator 602 can down convert the signal from the readout electronics 213. An analog-to-digital converter 604 can be employed to digitize the down-converted signal.

An integration unit 606 can integrate one or more kernels 612 with the digitized signal, such as supported by the analytical model 222, such as based on stored data (e.g., thresholds 219, kernels 612, probability distributions, signal values and/or the like). That is, the voltage can be integrated using phase information to achieve a point in a 2D plane. Depending on the qubit state, that point tends to be in one area or another of the plane. Thereafter, the integration result for the qubit measurement can be projected to a known state vector as a one dimensional signal value, and the statistics such as histograms of the qubit readout can be obtained. That is, for example, in a case in which integrating the measurement result with a kernel yields two-dimensional (2D) values, the 2D point can be projected onto a state vector to reduce the 2D point to a one-dimensional (1D) signal value, such that the preceding histogram analysis, which can employ 1D data, can be applied.

In one or more embodiments, the local oscillator 602, ADC 604 and/or integration unit 606 can be comprised by and/or employed by the calibration component 212 and/or the classification component 214.

In one or more embodiments, up to 256 threshold/kernel can be stored per ADC channel. In one or more embodiments, plural ADC channels can be employed. For example, the thresholds and the kernels can be pre-computed (not in real time, because it can take too long to perform within the coherence time of the employed qubits), based on prior measurements and can be "kept" in some kind of "storage" for use. This can be to prepare ahead of execution, such as where computation during execution of a circuit can undesirably use available coherence time of the employed qubits. The thresholds/kernels can be retrieved quickly enough to complete the overall quantum circuit operation within the qubit coherence time.

An integrated output from the integration unit 606 can be obtained by a comparator, such as comprised by and/or employed by the decision component 618. The decision component 618 can output one or more thresholds 219 for determining what reset pulse 211 and/or whether a reset pulse 211 is to be generated. The decision component 618 can employ the analytical model 222, which can employ the one or more stored thresholds 219. For example, measurements can be performed when an electrical trigger signal is asserted, with one measurement for one assertion of the trigger signal. For sake of brevity, how the triggers are asserted can be determined by the overall quantum operation.

As an example, if one wants to perform 3 resets successively to achieve the desired level of low error, such loop can involve use of 3 different thresholds and/or kernels, rotating through the first through the third threshold and/or kernel, then back to the first, for successive measurements.

Upon a new measurement, the new signal can be compared to the statistics, the plane can be collapsed to a single line, and then the qubit state can be determined. It is noted that the results of integrating the readout data with the kernels can yield a data set consisting of 2D (two dimensional) values. For example, the final integrated signal value can be compared to the determined threshold 219. That is, as mentioned above, measurements can be performed when an electrical trigger signal is asserted. A 'new' measurement can refer to the measurement on assertion of a trigger that can occur after, such as immediately after, a completed measurement.

That is, the actual qubit state can be classified employing the state threshold 219, such as by the decision component 218. For example:

Excited (|1>) State if Signal Value≥Threshold, or

Ground (|0>) State if Signal Value<Threshold, or vice versa.

The conditional pulse generator, such as comprised by, being, and/or employed by the waveform generator 210 then generate a reset pulse 211 to control the respective qubit, such as to de-excite the qubit towards or to a ground state. That is, based on the determined actual qubit state, a reset pulse can be conditionally generated to affect the qubit, such as where the qubit is not yet in a ground state (e.g., signal value is greater than or equal to the threshold).

Figure 7:
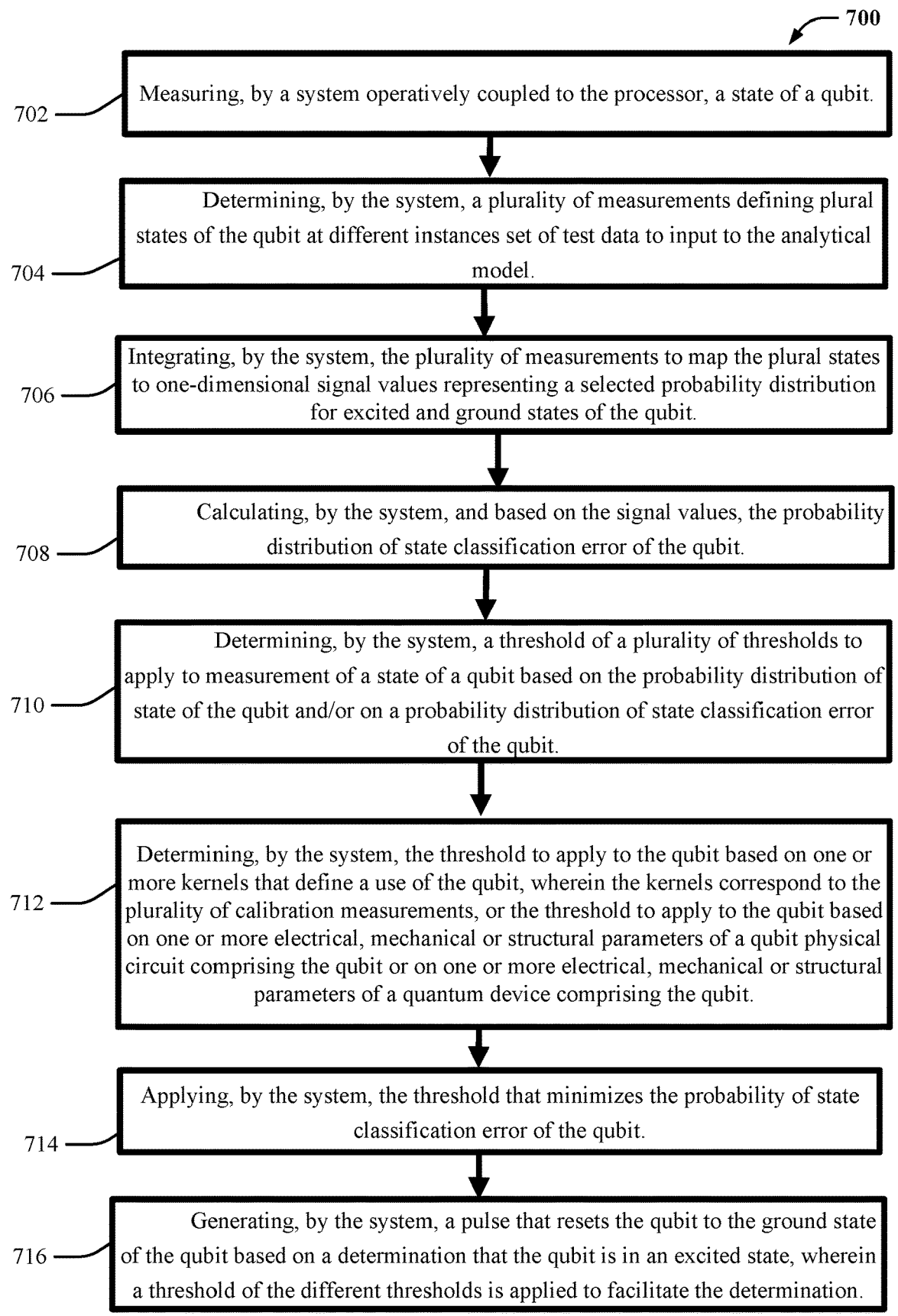
FIG. 7 illustrates a process flow for providing dynamic determination of a threshold for determining a state of a qubit, and optionally, application of the threshold for operating a pulse to de-excite the qubit to the ground state, in accordance with one or more embodiments described herein.

Next, FIG. 7 illustrates a flow diagram of an example, non-limiting method 700 that can provide a process to dynamically determine a threshold for determining a state of a qubit, and optionally to apply the threshold for operating a pulse to de-excite the qubit to the ground state, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise measuring, by a system operatively coupled to the processor (e.g., readout electronics 213), a state of a qubit (e.g., qubit 207; 207A).

At 704, the non-limiting method 700 can comprise determining, by the system (e.g., calibration component 212) a plurality of measurements defining plural states of the qubit at different instances (e.g., quantum measurement readouts 220).

At 706, the non-limiting method 700 can comprise integrating, by the system (e.g., calibration component 212), the plurality of measurements to map the plural states to one-dimensional signal values representing a selected probability distribution for excited and ground states of the qubit.

At 708, the non-limiting method 700 can comprise calculating, by the system (e.g., classification component 214), and based on the signal values, the probability distribution of state classification error of the qubit.

At 710, the non-limiting method 700 can comprise determining, by the system (e.g., decision component 218 and/or analytical model 222), a threshold of a plurality of thresholds to apply to measurement of a state of a qubit based on the probability distribution of state of the qubit and/or on a probability distribution of state classification error of the qubit.

At 712, the non-limiting method 700 can comprise determining, by the system (e.g., decision component 218 and/or analytical model 222), the threshold to apply to the qubit based on one or more kernels that define a use of the qubit, wherein the kernels correspond to the plurality of calibration measurements, or the threshold to apply to the qubit based on one or more electrical, mechanical or structural parameters of a qubit physical circuit comprising the qubit or on one or more electrical, mechanical or structural parameters of a quantum device comprising the qubit.

At 714, the non-limiting method 700 can comprise applying, by the system (e.g., decision component 218 and/or analytical model 222), the threshold (e.g., threshold 219) that minimizes the probability of state classification error of the qubit.

At 716, the non-limiting method 700 can comprise generating, by the system (e.g., waveform generator 210), a pulse (e.g., reset pulse 211) that resets the qubit to the ground state of the qubit based on a determination that the qubit is in an excited state, wherein a threshold of the different thresholds is applied to provide the determination.

In addition, one or more practical considerations can apply to use of one or more embodiments discussed above. For example, conditional reset of a qubit can be performed in real-time; T1 decay between readout and reset pulse can increase reset error; other qubits not being reset, still can deteriorate via T1 decay and T2 decoherence; T1 and T2 can be on the order of 50~100 us for superconducting transmon qubits; conditional reset cycle time (from sending measurement pulse to end of reset) can be about 1 μs; and hardware can be controlled to read out qubit state and control conditional pulse, without software intervention.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to a process to dynamically determine a threshold for determining a state of a qubit and apply the threshold for operating a pulse to de-excite the qubit. A system can comprise a memory that stores computer executable components, and a processor that executes the computer executable components stored in the memory, wherein the computer executable components can comprise a decision component that is configured to determine a threshold of a plurality of thresholds to apply to measurement of a state of a qubit based on a probability distribution of state of the qubit, wherein a measurement at one side of the threshold is representative of the qubit being in the ground state, and wherein a measurement at another side of the threshold is representative of the qubit being in an excited state.

An advantage of one or more of the above-indicated system, computer-implemented method and/or computer program product can be determining a threshold in real time to apply to a measurement of a state of a qubit to enable more accurate measurements of the equipment. This can reduce a number of operations employed to produce an acceptable result.

An advantage of one or more of the above-indicated system, computer-implemented method and/or computer program product can be an ability to dynamically adapt a threshold employed for determining a state of a qubit, based on the present probability distribution determined. In such case, more accurate determination of an actual state of the qubit can be employed. This can reduce inaccurate determinations, which can thus increase execution of a quantum circuit performed. That is, additional operations can be performed, optimizing coherence time usage of one or more qubits. And further, reduced inaccurate determinations can result in more accurate final measurements of the quantum circuit performed.

Another advantage of one or more of the above-indicated system, computer-implemented method and/or computer program product can be dynamic application of an accurate and probability distribution-based threshold, as compared to continuous use of an inapplicable threshold, such as for multiple reset iterations.

Yet another advantage of one or more of the above-indicated system, computer-implemented method and/or computer program product can be an ability to reset a qubit to a true ground state, rather than inaccurately resetting to a lower excited state that is not a true ground state.

Indeed, in view of the one or more embodiments described herein, a practical application of the systems, computer-implemented methods and/or computer program products described herein can be ability to generate a signal to de-excite a qubit more accurately, such as to a ground state. Such is a useful and practical application of computers, thus providing enhanced (e.g., improved and/or optimized) operation of the employed qubits, such as within a quantum logic circuit having plural qubits, such as about 1000 qubits, or more. Overall, such computerized tools can constitute a concrete and tangible technical improvement in the field of quantum computing.

Furthermore, one or more embodiments described herein can be employed in a real-world system based on the disclosed teachings. For example, one or more embodiments described herein can function within a quantum system that can receive as input a quantum job request and can measure a real-world qubit state of one or more qubits, such as superconducting qubits, of the quantum system. To de-excite a qubit to a ground state, such as to re-employ that qubit in a quantum circuit being performed, the measurements can be employed to dynamically determine a threshold for determining a state of a qubit prior to application of a reset pulse.

Moreover, a device and/or method described herein can be implemented in one or more domains, such as quantum domains, to enable scaled quantum program executions. Indeed, use of a device as described herein can be scalable, such as where plural thresholds, and kernels related thereto, are determined and/or stored, such as relative to plural different measurements (or sets of measurements) for respective plural qubits. These one or more processes can be performed at least partially at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to generation of a waveform, as compared to existing systems and/or techniques. Systems, computer-implemented methods and/or computer program products providing performance of these processes are of great utility in the field of quantum computing and superconducting quantum systems and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively determine a threshold for determining a state of a qubit based on a qubit readout measurement as the one or more embodiments described herein can provide this process. And neither can a human, or even thousands of humans, efficiently, accurately and/or effectively determine a state of the qubit employing the threshold, and subsequently apply a reset pulse where applicable. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above.

One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
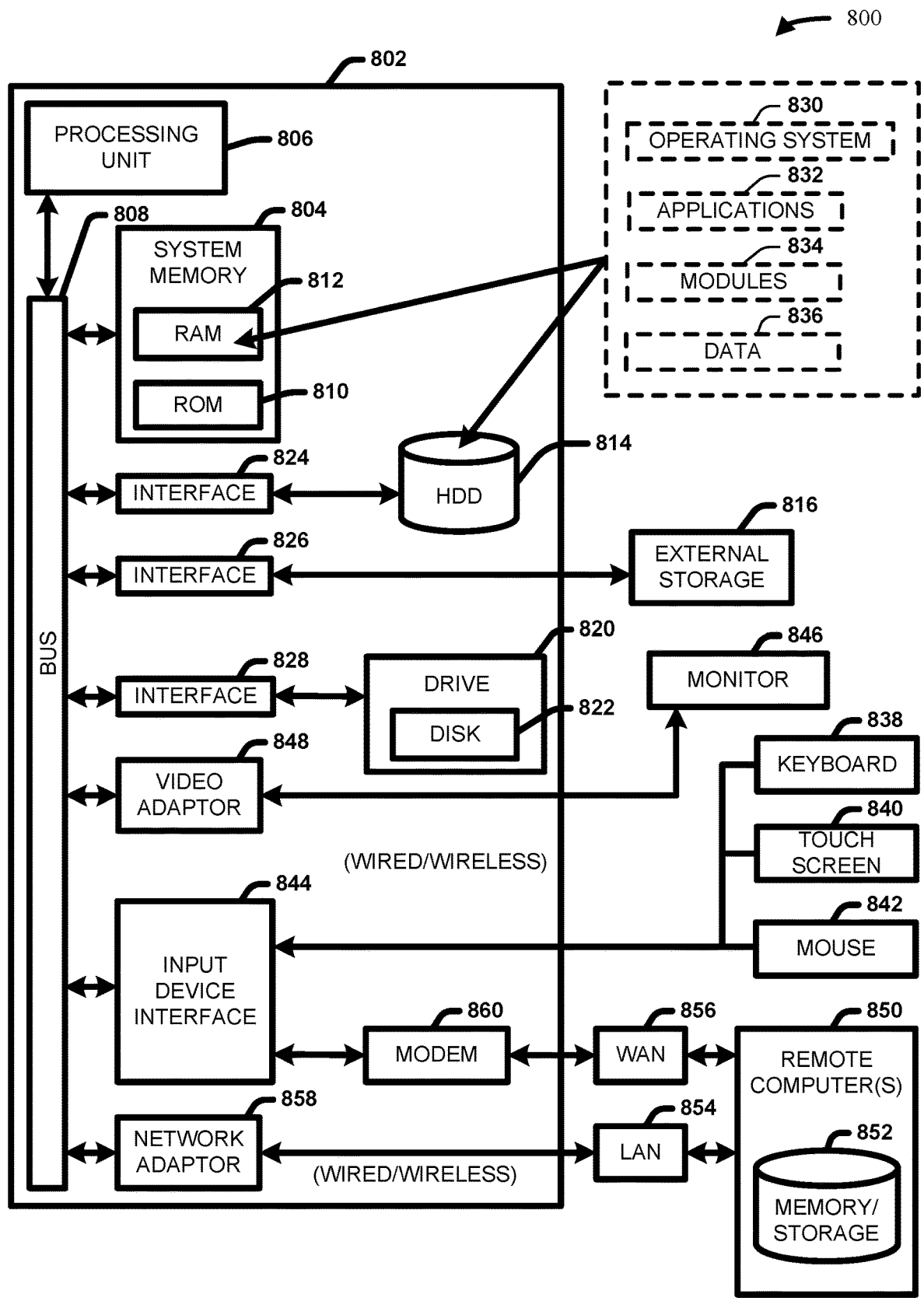
FIG. 8 illustrates a block diagram of an example, non-limiting, operating environment in which one or more embodiments described herein can be provided.
Figure 9:
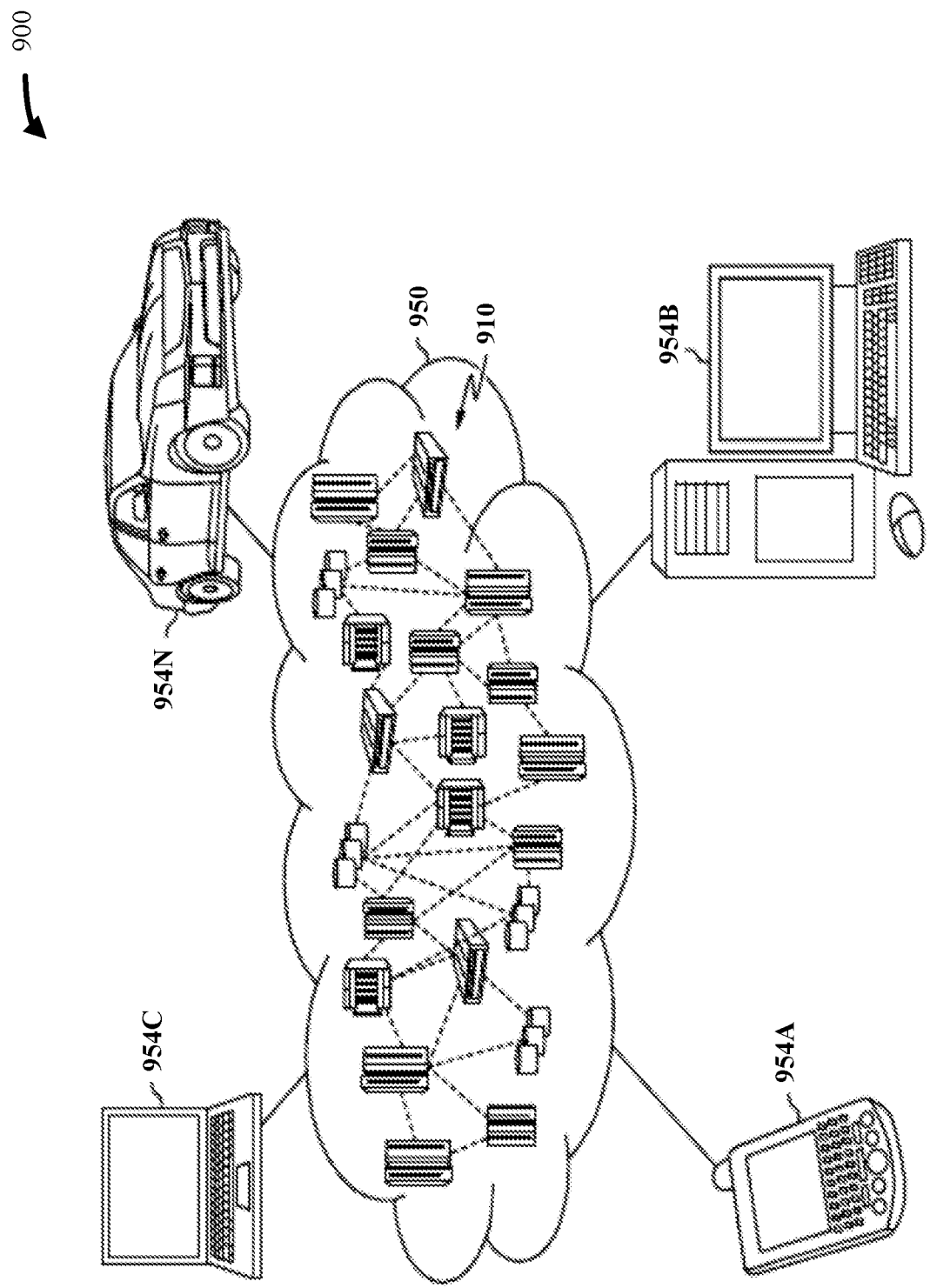
FIG. 9 illustrates a block diagram of an example, non-limiting, cloud computing environment in accordance with one or more embodiments described herein.
Figure 10:
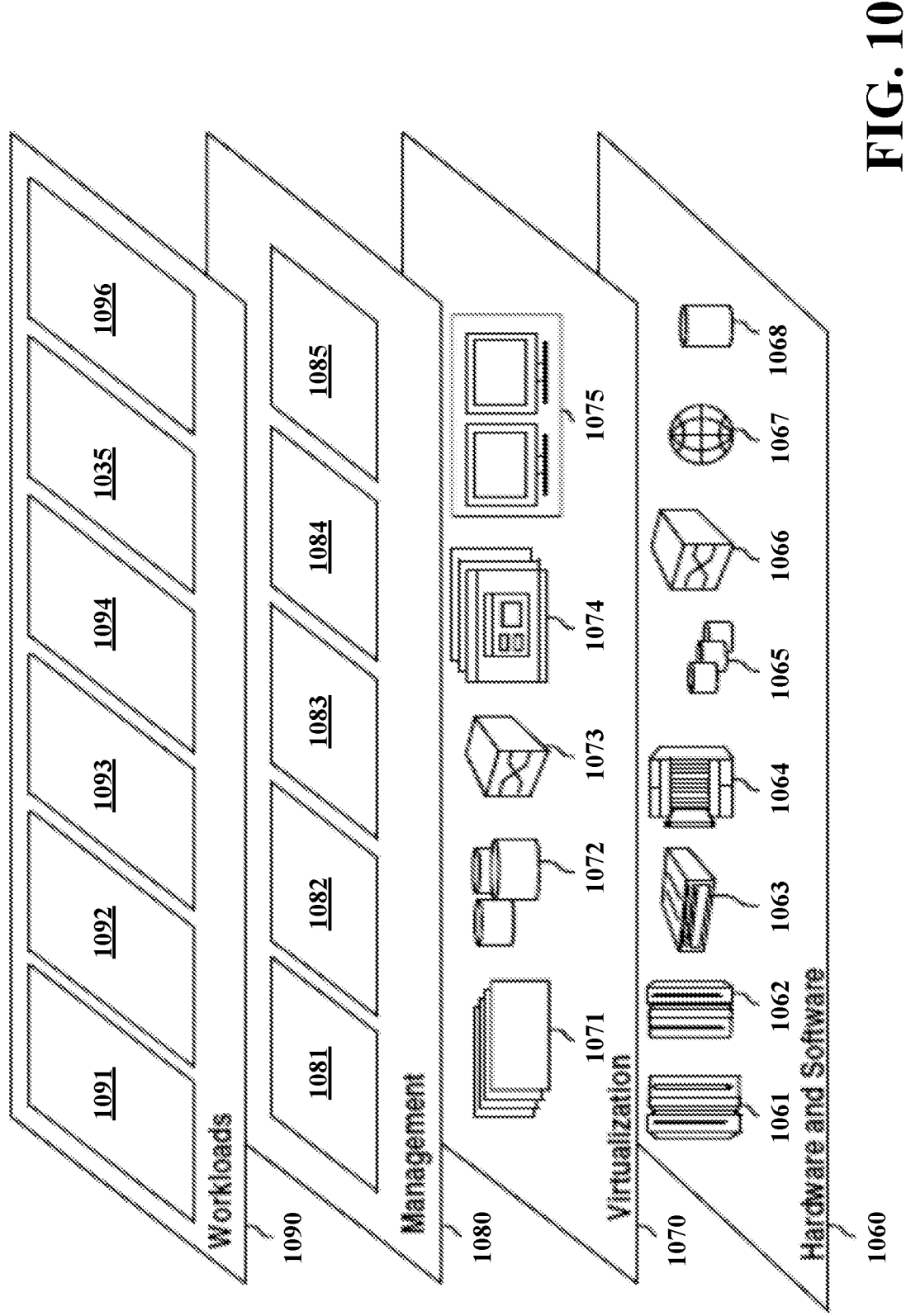
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106, 215 and/or 206 of the non-limiting systems 100 and/or 200. The processing unit 806 can be implemented in combination with and/or alternatively to processors such as 106, 215 and/or 206.

Memory 804 can store one or more computer and/or machine readable, writable and/or executable components and/or instructions that, when executed by processing unit 806 (e.g., a classical processor, a quantum processor and/or like processor), can provide performance of operations defined by the executable component(s) and/or instruction(s). For example, memory 804 can store computer and/or machine readable, writable and/or executable components and/or instructions that, when executed by processing unit 806, can provide execution of the one or more functions described herein relating to non-limiting system 100 and/or non-limiting system 200, as described herein with or without reference to the one or more figures of the one or more embodiments.

Memory 804 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 806 can comprise one or more types of processors and/or electronic circuitry (e.g., a classical processor, a quantum processor and/or like processor) that can implement one or more computer and/or machine readable, writable and/or executable components and/or instructions that can be stored at memory 804. For example, processing unit 806 can perform one or more operations that can be specified by computer and/or machine readable, writable and/or executable components and/or instructions including, but not limited to, logic, control, input/output (I/O), arithmetic and/or the like. In one or more embodiments, processing unit 806 can be any of one or more commercially available processors. In one or more embodiments, processing unit 806 can comprise one or more central processing unit, multi-core processor, microprocessor, dual microprocessors, microcontroller, System on a Chip (SOC), array processor, vector processor, quantum processor and/or another type of processor. The examples of processing unit 806 can be employed to implement one or more embodiments described herein.

The system bus 808 can couple system components including, but not limited to, the system memory 804 to the processing unit 806. The system bus 808 can comprise one or more types of bus structure that can further interconnect to a memory bus (with or without a memory controller), a peripheral bus and/or a local bus using one or more of a variety of commercially available bus architectures. The system memory 804 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can include a high-speed RAM, such as static RAM for caching data.

The computer 802 can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally, and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) can be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and/or methods described herein can be implemented utilizing one or more commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that can allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and/or information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that supports communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 950 described below with reference to illustration 900 of FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 9). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes at least one of the computer executable components that:
      determines a threshold of a plurality of thresholds to employ in performing a real-time measurement of a state of a qubit of a quantum processing device, wherein a measurement at one side of the threshold is representative of the qubit being in a ground state, and wherein a measurement at another side of the threshold is representative of the qubit being in an excited state, wherein the determining comprises:
         determining, based on a plurality of measurements defining plural states of the qubit at different instances, a first probability distribution of a state readout of the qubit being erroneously classified as the ground state,
         determining, based on the plurality of measurements defining the plural states of the qubit at the different instances, a second probability distribution of the state readout of the qubit being erroneously classified as the excited state, and
         selecting the threshold from the plurality of thresholds based on respective errors determined for the plurality of thresholds using the first probability distribution and the second probability distribution.

2. The system of claim 1, wherein the selecting is further based on one or more electrical, mechanical or structural parameters of at least one of a qubit physical circuit comprising the qubit or the quantum processing device.

3. The system of claim 1, wherein the at least one of the computer executable components further:
   integrates the plurality of measurements to map the plural states to one-dimensional signal values.

4. The system of claim 1, wherein the the determining the threshold employs a supervised learning model that determines the threshold to apply for a quantum circuit comprising the qubit based on one or more kernels that apply to the quantum circuit, and wherein the one or more kernels are written based on the plurality of measurements.

5. The system of claim 1, wherein at least one of the first probability distribution or the second probability distribution is determined using a normal cumulative distribution function.

6. The system of claim 1, wherein the determining the threshold is further based on one or more kernels that define a use of the qubit, and wherein the one or more kernels correspond to the plurality of measurements.

7. The system of claim 1, wherein the at least one of the computer executable components further:
measures the state of the qubit; and
generates a pulse that resets the qubit to the ground state based on a determination, using the threshold, that the qubit is in the excited state.

8. A computer-implemented method, comprising:
determining, by a system operatively coupled to a processor, a threshold of a plurality of thresholds to employ in performing a real-time measurement of a state of a qubit of a quantum processing device, wherein a measurement at one side of the threshold is representative of the qubit being in a ground state, and wherein a measurement at another side of the threshold is representative of the qubit being in an excited state, wherein the determining comprises:
determining, based on a plurality of measurements defining plural states of the qubit at different instances, a first probability distribution of a state readout of the qubit being erroneously classified as the ground state,
determining, based on the plurality of measurements defining the plural states of the qubit at the different instances, a second probability distribution of the state readout of the qubit being erroneously classified as the excited state, and
selecting the threshold from the plurality of thresholds based on respective errors determined for the plurality of thresholds using the first probability distribution and the second probability distribution.

9. The computer-implemented method of claim 8, wherein the selecting is further based on one or more electrical, mechanical or structural parameters of at least one of a qubit physical circuit comprising the qubit or the quantum processing device.

10. The computer-implemented method of claim 8, wherein the determining the threshold further comprises:
integrating the plurality of measurements to map the plural states to one-dimensional signal values.

11. The computer-implemented method of claim 8, further comprising:
writing, by the system, one or more kernels based on the plurality of measurements; and
employing, by the system, a supervised learning model that determines the threshold to apply for a quantum circuit comprising the qubit based on the one or more kernels.

12. The computer-implemented method of claim 8, wherein at least one of the first probability distribution or the second probability distribution is determined using a normal cumulative distribution function.

13. The computer-implemented method of claim 8, further comprising:
determining, by the system, the threshold to apply to the qubit based on one or more kernels that define a use of the qubit, wherein the one or more kernels correspond to the plurality of measurements.

14. The computer-implemented method of claim 8, further comprising:
measuring, by the system, the state of the qubit; and
generating, by the system, a pulse that resets the qubit to the ground state based on a determination, using the threshold, that the qubit is in the excited state.

15. A computer program product enabling a process to dynamically determine a threshold for determining a state of a qubit, the computer program product comprising a non-transitory computer readable medium having program instructions embodied therewith, the program instructions executable by a processor to cause the processor to:
determine, by the processor, the threshold of a plurality of thresholds to employ in performing a real-time measurement of the state of the qubit of a quantum processing device, wherein a measurement at one side of the threshold is representative of the qubit being in a ground state, and wherein a measurement at another side of the threshold is representative of the qubit being in an excited state, wherein the determining comprises:
determining, based on a plurality of measurements defining plural states of the qubit at different instances, a first probability distribution of a state readout of the qubit being erroneously classified as the ground state,
determining, based on the plurality of measurements defining the plural states of the qubit at the different instances, a second probability distribution of the state readout of the qubit being erroneously classified as the excited state, and
selecting the threshold from the plurality of thresholds based on respective errors determined for the plurality of thresholds using the first probability distribution and the second probability distribution.

16. The computer program product of claim 15, wherein the program instructions are further executable by the processor to cause the processor to:
write, by the processor, one or more kernels based on the plurality of measurements; and
employ, by the processor, a supervised learning model that determines the threshold to apply for a quantum circuit comprising the qubit based on the one or more kernels.

17. The computer program product of claim 15, wherein the program instructions are further executable by the processor to cause the processor to:
determine, by the processor, the threshold to apply to the qubit based on one or more kernels that define a use of the qubit, wherein the one or more kernels correspond to the plurality of measurements.

18. The computer program product of claim 15, wherein the program instructions are further executable by the processor to cause the processor to:
measure, by the system, the state of the qubit; and
generate, by the system, a pulse that resets the qubit to the ground state based on a determination, using the threshold, that the qubit is in the excited state.

19. The computer program product of claim 15, wherein at least one of the first probability distribution or the second probability distribution is determined using a normal cumulative distribution function.

20. The computer program product of claim 15, wherein the determining the threshold further comprises:
integrating the plurality of measurements to map the plural states to one-dimensional signal values.

* * * * *